Patented Jan. 18, 1949

2,459,684

UNITED STATES PATENT OFFICE 2,459,684

ESTER LACTONES

Willard J. Croxall, Bryn Athyn, and Harry T. Neher, Bristol, Pa., assignors to Röhm & Haas Company, Philadelphia, Pa., a corporation of Delaware No Drawing. Application September 11, 1945, Serial No. 615,708

3 Claims. (Cl. 260—344.6)

This invention relates to lactones formed from half esters of cis-3,6-endomethylene-$\Delta^4$-tetrahydrophthalic acid. With greater particularity, this invention deals with the preparation of lactones formed from esters from one molecular equivalent of an alcohol and one mol of cis-3,6-endomethylene-$\Delta^4$-tetrahydrophthalic acid by subjecting said esters to the action of a trace of water and a very strong acid.

As a starting material, 3,6-endomethylene-$\Delta^4$-tetrahydrophthalic anhydride is particularly convenient. It is obtained by addition of maleic anhydride to cyclopentadiene. This addition product readily reacts with one mol of an alcohol to give a half ester, which, it is now found, is converted to new lactones when heated with a trace of water and of a very strong acid, such as sulfuric acid. The formation of an inner ring takes place in a short time at temperatures of about 25° C. to about 150° C., preferably at 75° to 85° C. It may be effected in the presence of a solvent, such as ethylene dichloride, benzene, toluene, xylene, naphtha, or the like, and the solvent stripped off in the isolation of the lactones. The lactones from the lower alcohols may be purified by distillation under low pressures. Charcoaling and extracting are useful procedures for purifying the ester-lactones from long-chained alcohols.

Lactone formation may be obtained with half esters from any alcohol, monohydric or polyhydric. The liquid lactones from half esters of the former class of alcohols have thus far proved particularly useful. While the methyl ester lactone is a solid, the lactones from monohydric alcohols of three to about twelve carbon atoms are generally liquid in nature, although there is a tendency with increasing length of chain for the lactones to become wax-like. The octadecyl ester-lactone, for example, is a waxy solid at room temperature. These liquid esterlactones have compatibility with many types of resins in exceptionally wide proportions. In vinyl resins, for example, they supply excellent softening action without imparting market loss in tensile strength. In butadiene-acrylonitrile rubbers, they give good plasticity values. Various lactones are useful as insecticidal toxicants and repellents.

Alcohols which may be reacted include aliphatic, arylaliphatic, cycloaliphatic, and heterocyclic-aliphatic alcohols, such as propyl, allyl, isopropyl, butyl, isobutyl, methallyl, crotyl, cinnamyl, amyl, hexyl, octyl, 2-ethylhexyl, decyl, and dodecyl, and also methyl, ethyl, cetyl, octadecyl, oleyl, benzyl, tetrahydrofurfuryl, dihydronordicyclopentadienyl, terpenyl, ethoxyethyl, butoxyethyl, phenoxyethyl, ethoxyethoxyethyl, methoxyethoxyethyl, butoxyethoxyethyl, octoxyethoxyethyl, ethoxyethoxyethoxyethyl, etc., among the monohydric alcohols, and such polyhydric alcohols as ethylene glycol, propylene glycol, diethylene glycol, the monomethyl ether of glycerol, glycerol, sorbitol, mannitol, and the like.

The invention is illustrated by the following examples.

Example 1

A mixture of 328 parts of 3,6-endomethylene-$\Delta^4$-tetrahydrophthalic anhydride, 64 parts of anhydrous methanol, and 200 parts of benzene was heated to 60°–70° C. for one hour. There was thus formed the monomethyl ester of cis-3,6-endomethylene-$\Delta^4$-tetrahydrophthalic acid. The batch was cooled, and twelve parts of concentrated sulfuric acid and ten parts of water were added. The resulting mixture was refluxed for one hour. The reaction mixture was then cooled, washed with a 20% sodium carbonate solution, and distilled. The fraction boiling at 157° to 165° C./4 mm. crystallized in the receiver and was identified as the methyl ester lactone. It was recrystallized from ethyl acetate and melted at 84° C. (uncorrected). The yield was 228 parts, amounting to 58% of theory.

Example 2

A mixture of 74 parts of butyl alcohol, 164 parts of 3,6-endomethylene-$\Delta^4$-tetrahydrophthalic anhydride, and 200 parts of benzene was heated at about 70° C. for about one hour. The reaction mixture was cooled and treated with ten parts of sulfuric acid and five parts of water. Thereupon, the mixture was refluxed for two hours, whereupon it was cooled, washed with saturated sodium carbonate solution, dried over potassium carbonate, and fractionally distilled. The fraction coming over at 160°–165° C./2 mm. was a liquid which had the following probable formula

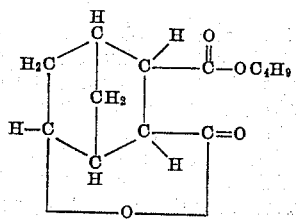

The yield was 48% of a product having a cis configuration and having a 96% purity as determined from the saponification number. It had a refractive index, $N_D^{28}$ of 1.483.

The above lactone was milled into Vinylite VYNW to give a tough, flexible sheet which retained its properties over a wide temperature range. At 30% in a butadiene-acrylonitrile copolymer, it gave a composition of good tensile strength and low plasticity.

Example 3

By the procedure of Example 2, there were reacted 186 parts of dodecyl alcohol, 164 parts of 3,6-endomethylene - $\Delta^4$ - tetrahydrophthalic anhydride, and 200 parts of benzene. There were then added ten parts of sulfuric acid and five parts of water, and this mixture was heated under reflux for two hours. The reaction mixture was cooled, washed with saturated soda ash solution, dried over anhydrous potassium carbonate, and freed from solvent under reduced pressure. The residue, amounting to 320 parts, was a viscous liquid, which was soluble in hydrocarbon solvents, ketones, and esters, but insoluble in water. The residue as obtained contained 91% (as determined by saponification number) of the desired cis ester lactone, having the probable structure

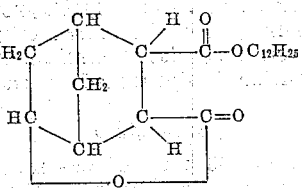

In place of the butyl or dodecyl half esters used above, there may be used half esters of any other monohydric aliphatic alcohol of three to twelve carbon atoms. When these are heated with a small amount of water and of sulfuric acid, they yield esters of cis-3,6-endomethylene hexahydrophthalyl lactone which are liquids and which have compatibility with a great variety of resinous materials, serving as highly useful plasticizers for them. Particular mention should be made of the various octyl derivatives, including not only the n-octyl ester but also the 2-ethylhexyl and the capryl esters.

Example 4

There were heated together at 90°–120° C. for two hours 328 parts of 3,6-endomethylene-$\Delta^4$-tetrahydrophthalic anhydride and 180 parts of ethoxyethanol. The reaction product was cooled, and 200 parts of benzene, 20 parts of sulfuric acid, and 10 parts of water were added. This mixture was heated under reflux for three hours, then cooled, and washed with saturated sodium carbonate solution. It was then fractionally distilled. There was obtained a fraction of 225 parts, boiling at 185°–190° C./1–2 mm., as a slightly yellow liquid, which contained by saponification number 98% of the ethoxyethyl ester of cis-3,6-endomethylene hexahydrophthalyl lactone.

Example 5

By the method of Example 4 there were reacted one mol of 3,6-endomethylene-$\Delta^4$-tetrahydrophthalic anhydride and one mol of butoxyethanol. The product was taken up in solvent and heated with five parts of water and ten parts of sulfuric acid. After the acid had been neutralized and the product dried, solvent was stripped off at reduced pressure. A residue of 96% purity for the butoxyethyl ester of the cis isomer of endomethylene hexahydrophthalyl lactone was obtained.

Example 6

A mixture of three mols of 3,6-endomethylene-$\Delta^4$-tetrahydrophthalic anhydride and three mols of allyl alcohol was heated to reflux in the presence of ethylene dichloride. The reaction mixture was cooled and treated with twenty grams of sulfuric acid and ten grams of water. This mixture was heated under reflux for two hours. It was then washed, dried, and distilled. The desired cis allyl ester lactone boiled at 165°–168° C./3 mm. The distillate was pure by saponification number. This product gave a viscous liquid when heated with benzoyl peroxide. It was soluble in hydrocarbons, chlorinated solvents, ketones, esters, and the like. It may be used as a softener and plasticizer for resins of many types.

Example 7

A mixture of 130 parts of 2-ethylhexyl alcohol and 164 parts of 3,6-endomethylene-$\Delta^4$-tetrahydrophthalic anhydride was heated at 95°–100° C. for two hours, then cooled, and treated with 100 parts of benzene, five parts of water, and ten parts of sulfuric acid. This reaction mixture was refluxed for two hours. It was then cooled, and 300 parts of ethyl alcohol and 10 parts of potassium carbonate were added. The mixture was filtered and heated under reduced pressure to remove volatile material. There was obtained 143 parts of a viscous oil which solidified to a waxy solid. This product, the cis-2'-ethylhexyl 3,6-endomethylenehexahydrophthalyl $\delta$-lactone, was particularly suitable as a relatively non-volatile plasticizer.

We claim:

1. A method of forming the butyl ester of cis-3,6-endomethylene hexahydrophthalyl lactone which comprises heating the half butyl ester of cis - 3,6 - endomethylene - $\Delta^4$-tetrahydrophthalic acid with a small proportion of water and of sulfuric acid.

2. A method of forming the 2-ethylhexyl ester of cis-3,6-endomethylene hexahydrophthalyl lactone which comprises heating the half 2-ethylhexyl ester of cis-3,6-endomethylene-$\Delta^4$-tetrahydrophthalic acid with a small proportion of water and of sulfuric acid.

3. A method of forming esters of cis-3,6-endomethylene hexahydrophthalyl lactone which comprises heating a half ester of cis-3,6-endomethylene-$\Delta^4$-tetrahydrophthalic acid and a monohydric aliphatic alcohol of three to twelve carbon atoms with a small proportion of water and of sulfuric acid.

WILLARD J. CROXALL.
HARRY T. NEHER.

REFERENCES CITED

The following references are of record in the file of this patent:

UNITED STATES PATENTS

| Number | Name | Date |
| --- | --- | --- |
| 2,275,385 | Soday | Mar. 3, 1942 |

OTHER REFERENCES

Alder et al., Annalen der Chemie, 514 (1934), pp. 1–33.

Alder et al., Chemical Abstracts, 1935, pp. 2157–58.